(12) United States Patent
Segawa et al.

(10) Patent No.: US 11,005,323 B2
(45) Date of Patent: May 11, 2021

(54) ROTOR (71) Applicant: TOYOTA JIDOSHA KABUSHIKI KAISHA, Toyota (JP)

(72) Inventors: Tomohiro Segawa, Toyota (JP); Hiroshi Kinpara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/525,992

(22) Filed: Jul. 30, 2019

(65) Prior Publication Data

US 2020/0076256 A1  Mar. 5, 2020

(30) Foreign Application Priority Data

Sep. 3, 2018 (JP) .............................. JP2018-164764

(51) Int. Cl.
H02K 1/28 (2006.01)
H02K 1/30 (2006.01)
H02K 9/19 (2006.01)
H02K 7/00 (2006.01)
H02K 1/32 (2006.01)

(52) U.S. Cl.
CPC ................. *H02K 1/30* (2013.01); *H02K 1/32* (2013.01); *H02K 7/003* (2013.01); *H02K 9/19* (2013.01)

(58) Field of Classification Search
CPC .................................. H02K 1/30; H02K 1/28
See application file for complete search history.

(56) References Cited

U.S. PATENT DOCUMENTS

| 3,737,987 | A | * | 6/1973 | Bednarski | ............ | H02K 15/028 |
| | | | | | | 29/596 |
| 5,704,111 | A | * | 1/1998 | Johnson | .................. | H02K 1/30 |
| | | | | | | 29/451 |
| 6,072,252 | A | * | 6/2000 | Van Dine | ................ | F16C 3/026 |
| | | | | | | 310/43 |
| 6,927,526 | B2 | * | 8/2005 | Ishii | ........................ | H02K 1/28 |
| | | | | | | 310/156.08 |
| 7,268,461 | B2 | * | 9/2007 | Aisenbrey | ................ | H02K 1/02 |
| | | | | | | 310/251 |
| 7,423,357 | B2 | * | 9/2008 | Takahashi | .............. | H02K 1/278 |
| | | | | | | 310/156.14 |
| 2019/0181733 | A1 | * | 6/2019 | Kinpara | ................. | H02K 15/03 |

FOREIGN PATENT DOCUMENTS

| JP | 2000-125523 A | 4/2000 |
| JP | 2000-166194 A | 6/2000 |

* cited by examiner

*Primary Examiner* — Dang D Le (74) *Attorney, Agent, or Firm* — Sughrue Mion, PLLC (57) ABSTRACT A shaft of a rotor includes a cylindrical core member and a resin member. An uneven portion made up of first hole portions is formed on an outer peripheral surface of the core member. The resin member covers the outer peripheral surface of the core member, while being adhesively fixed to the first hole portions. A rotor core is attached to a periphery of the resin member.

8 Claims, 6 Drawing Sheets

ROTOR

CROSS-REFERENCE TO RELATED APPLICATIONS

This application claims priority to Japanese Patent Application No. 2018-164764 filed on September 3, which is incorporated herein by reference in its entirety.

BACKGROUND

1. Technical Field

The disclosure relates to a rotor having a shaft with an outer peripheral portion for which resin is utilized.

2. Description of Related Art

In a rotor (a rotator) of a motor, a shaft is generally formed of a metal or the like as a high strength member. However, there is also known a rotor of a motor in which resin is utilized to join a shaft and a rotor core to each other.

It is described in Japanese Patent Application Publication No. 2000-125523 (JP 2000-125523 A) that a rotor is formed by installing a rod-like metal serving as a core of a shaft and a rotor core in a mold, and injecting resin into the mold. The resin has an uneven outer peripheral surface. The resin and the rotor core are coupled to each other with the outer peripheral surface of the resin and a correspondingly shaped inner peripheral surface of the rotor core meshing with each other.

In Japanese Patent Application Publication No. 2000-166194 (JP 2000-166194 A), there is described a method of manufacturing a rotor by inserting a shaft into a shaft hole of a rotor core and injecting resin into a gap therebetween.

SUMMARY

In the case where the shaft is formed of metal, the rotation efficiency of the rotor falls due to an increase in weight. On the other hand, in the case where the shaft is formed of resin, the strength of the shaft is insufficient although a reduction in the weight thereof can be achieved. In particular, an increased strength is required of the shaft in the case where the output of the motor is high.

In the aforementioned Japanese Patent Application Publication No. 2000-125523 (JP 2000-125523 A) and the aforementioned Japanese Patent Application Publication No. 2000-166194 (JP 2000-166194 A), the shaft and the rotor core are coupled to each other through the injection of resin. However, these technologies do not aim at reducing the weight of the shaft, but merely attempt to enhance the accuracy or stability of the coupling between the shaft and the rotor core, and restrain the rotor from vibrating etc. Besides, the securement of the adhesion strength between the metal and resin constituting the shaft is not mentioned at all, either.

In the case where the outer peripheral portion of the shaft is formed of resin, an improvement in rotation characteristics can be expected due to a reduction in the weight of the shaft. However, when the transmitted torque becomes large, an inconvenience may be caused to the rotor due to the insufficient adhesion strength on an interface between resin and an inner peripheral portion of the shaft.

In the disclosure, there is provided a rotor that enhances the adhesion strength between resin and an inner peripheral portion of a shaft in the case where this resin is utilized for an outer peripheral portion of the shaft.

An aspect of the disclosure is a rotor including a shaft and a rotor core that are structured as follows. The shaft includes a core member and a resin member. The core member is a high-strength member that is formed cylindrically. An outer peripheral surface of the core member is provided with an uneven portion. The resin member covers the outer peripheral surface while being adhesively fixed to the uneven portion. The rotor core is attached to a periphery of the resin member.

In the aspect of the disclosure, the uneven portion may be provided through plastic forming or chemical processing. The plastic forming may be one of the following processing methods, namely, (i) blast processing, (ii) half blanking, and (iii) coining. Furthermore, the chemical processing may be etching processing.

In the aspect of the disclosure, the uneven portion may be provided by a first hole portion that penetrates from the outer peripheral surface to an inner hollow portion.

In the aspect of the disclosure, the resin member may be provided with a second hole portion that communicates with the first hole portion of the core member. A flow passage for cooling oil that extends from the inner hollow portion of the core member to the outer peripheral surface of the resin member may be formed by the first hole portion and the second hole portion.

In the aspect of the disclosure, the outer peripheral surface may be provided with the uneven portion, and the uneven portion may be provided by a recessed portion that does not penetrate to an inner hollow portion.

In the aspect of the disclosure, a plurality of glass fibers may be added into the resin member. Besides, a plurality of metals may be added into the resin member.

In the rotor according to the aspect of the disclosure, a reduced weight of the shaft of the rotor and high strength thereof can be made compatible with each other, and the output and torque of a motor employing this rotor can be enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Rotors according to the embodiments of the disclosure will be described hereinafter with reference to the drawings. For the sake of easy understanding, concrete aspects will be presented in the description. However, these concrete aspects exemplify the embodiments, and the disclosure can adopt various other embodiments.

Figure 1:
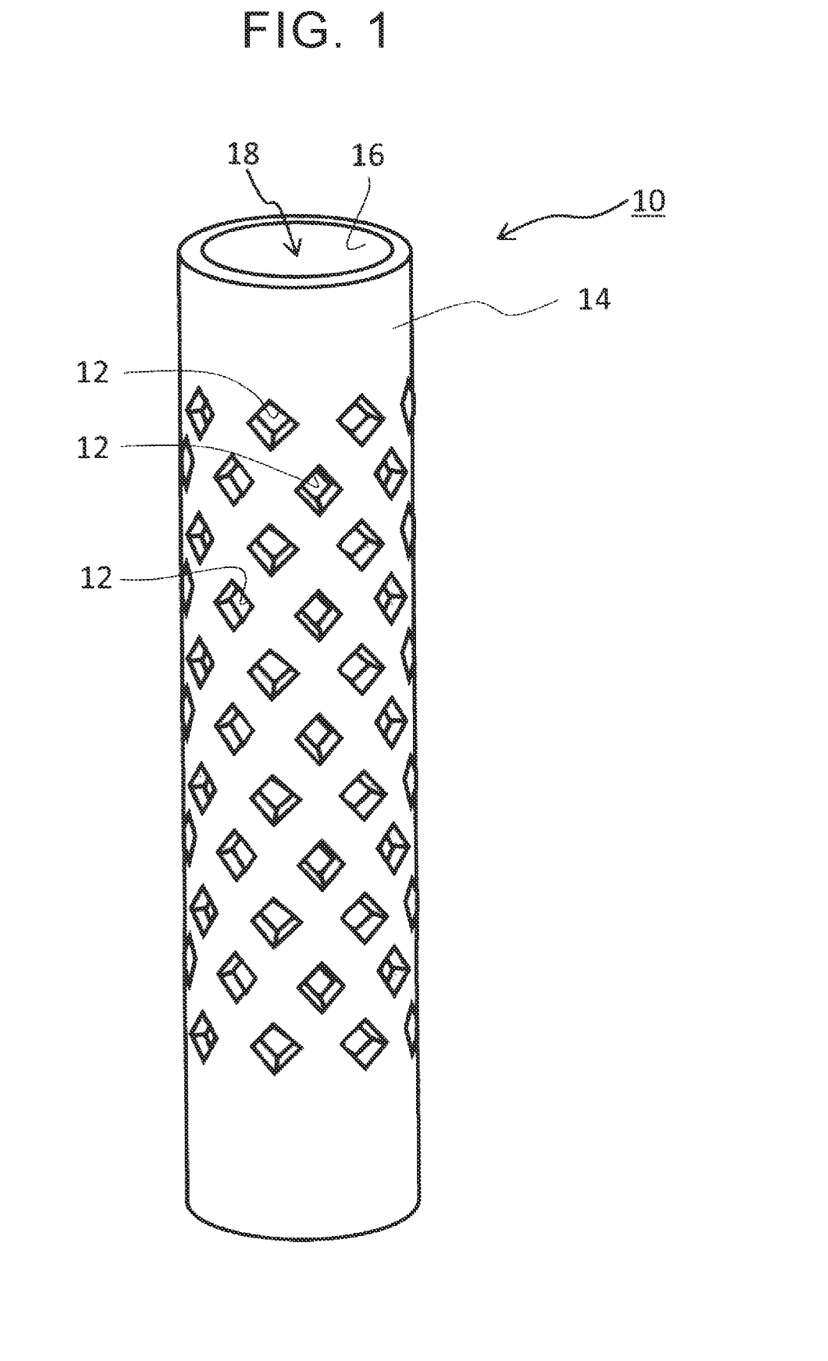
FIG. 1 is a perspective view of a core member of a shaft belonging to a rotor according to the first embodiment of the disclosure.

The rotor according to the first embodiment will be described with reference to FIGS. 1 to 6. FIG. 1 is a perspective view of a core member 10 of a shaft of the rotor according to the first embodiment. The core member 10 is formed in the shape of a circular cylinder. A plurality of first hole portions 12 that form an uneven portion on a wall surface of the core member 10 are provided in the vicinity of a central portion of the core member 10 in an axial direction thereof. This vicinity is a region to which a rotor core is fitted as will be described later, and a certain adhesion strength is required between the core member 10 and a resin member that is provided on a periphery thereof. The first hole portions 12 are through-holes that extend from an outer peripheral surface 14 of the core member 10 to an inner peripheral surface 16 thereof. Thus, the periphery of the core member 10 and an inner hollow portion 18 of the core member 10 communicate with each other. In the illustrated example, each of the first hole portions 12 substantially assumes the shape of a square opening. The opening area of each of the first hole portions 12 is sufficiently smaller than the area of the outer peripheral surface 14 of the core member 10. The first hole portions 12 are regularly provided along the entire circumference of the outer peripheral surface 14 of the core member 10. It should be noted, however, that the first hole portions 12 through the inner peripheral surface 16 on the far side are not shown in FIG. 1, for the sake of the simplification of diagrammatic representation. That is, the first hole portions 12 are provided through the outer peripheral surface 14 in such a manner as to ensure a substantially constant surface density, instead of converging on a specific region. Incidentally, although no first hole portions 12 are provided close to both ends of the core member 10 in the example of FIG. 1, an attempt to reduce the weight of the core member 10 may be made by providing first hole portions 12 close to both the ends of the core member 10.

The core member 10 is a member that ensures the strength of the shaft, and is formed of a strength member exhibiting higher strength than resin. Various metals such as steel including high tensile strength steel (HTSS), aluminum alloy, and the like can be mentioned as examples of the strength member. Besides, a nonmetal strength member such as carbon fiber reinforced plastic (CFRP) or the like can also be used as the core member 10. The core member 10 can be manufactured according to various manufacturing methods. For example, in the case where metal is used as the strength member, it is possible to mention (i) an aspect in which the core member 10 is manufactured by providing a metal member formed in the shape of a circular cylinder with the first hole portions 12, (ii) an aspect in which the core member 10 is formed by punching a metal plate to provide the first hole portions 12 therethrough and then rounding and welding the metal plate, (iii) an aspect in which the core member 10 is formed by causing molten metal to flow into a casting mold, and the like.

Figure 2:
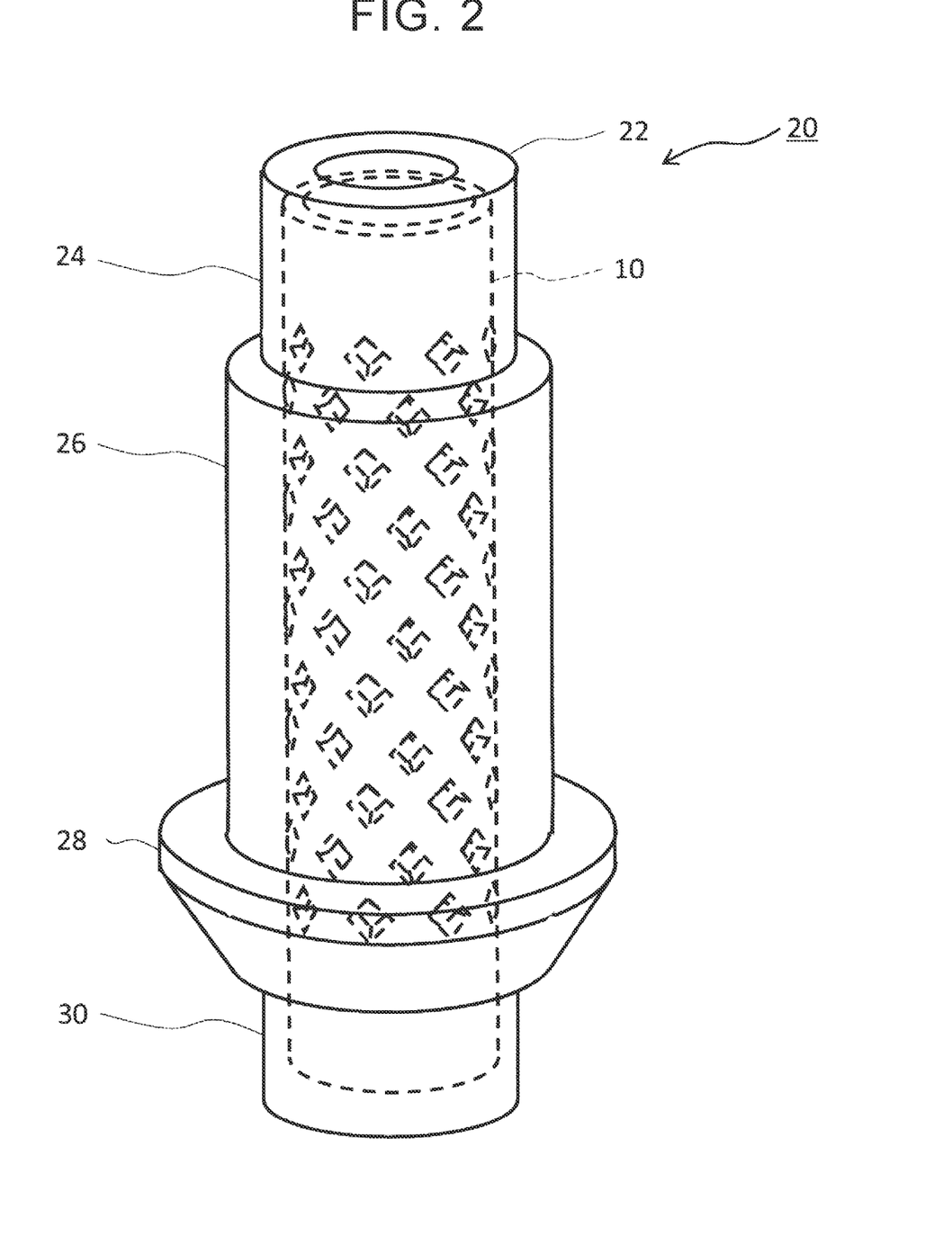
FIG. 2 is a perspective view of the shaft with the core member covered with a resin member.

FIG. 2 is a schematic perspective view of the shaft 20 according to the embodiment. The shaft 20 is formed of the core member 10 and a resin member 22 that covers a periphery thereof. The shaft 20 is formed through molding, that is, by setting the core member 10 into a mold, injecting resin thereinto, and curing the resin.

The resin member 22 is basically formed in the shape of a circular cylinder that is concentric with the core member 10, but the diameter of the circular cylinder varies along the axial direction. In concrete terms, a bearing sliding portion 24, a rotor core fitting portion 26, a fastening portion 28, and a bearing sliding portion 30 are formed from an upper end side toward a lower end side in the drawing. The bearing sliding portions 24, 30 at both the ends are regions for rotatably supporting both ends of the shaft 20 by bearings respectively, and are formed with a smaller diameter, namely, with a smaller thickness than the other regions. The rotor core fitting portion 26 is a region where the rotor core formed of electromagnetic steel sheets or the like is installed, and the diameter of the rotor core fitting portion 26 is set larger than that of the bearing sliding portions 24, 30. The fastening portion 28 is a region that serves as a stopper for preventing the rotor core from moving downward in the axial direction, and the diameter of the fastening portion 28 is set larger than that of any other portion.

For example, thermosetting resin is used as the resin constituting the resin member 22. The rotor generates heat through the flow of an inductive current at the time of rotation thereof. Therefore, the heat resistance of the rotor is enhanced through the use of thermosetting resin, which exhibits high heat resistance. Various resins such as phenol resin, epoxy resin, melamine resin, and the like can be used as thermosetting resin.

Incidentally, the resin member 22 can also assume shapes other than the shape depicted in the drawing. For example, a structure for attaching a resolver rotor for measuring rotation of the shaft can be formed in the vicinity of a border between the bearing sliding portion 24 and the rotor core fitting portion 26. The rotor core fitting portion 26 can be provided with key grooves or the like, with a view to preventing slippage with respect to the rotor core in a circumferential direction. This will be described later with reference to FIG. 5. Besides, as will be described subsequently, the rotor core fitting portion 26 can also be provided with through-holes that communicate with the first hole portions 12 of the core member 10 respectively. In resin molding, even a complicated or elaborate shape can be formed at a time, so the manufacturing cost can be reduced.

Figure 3:
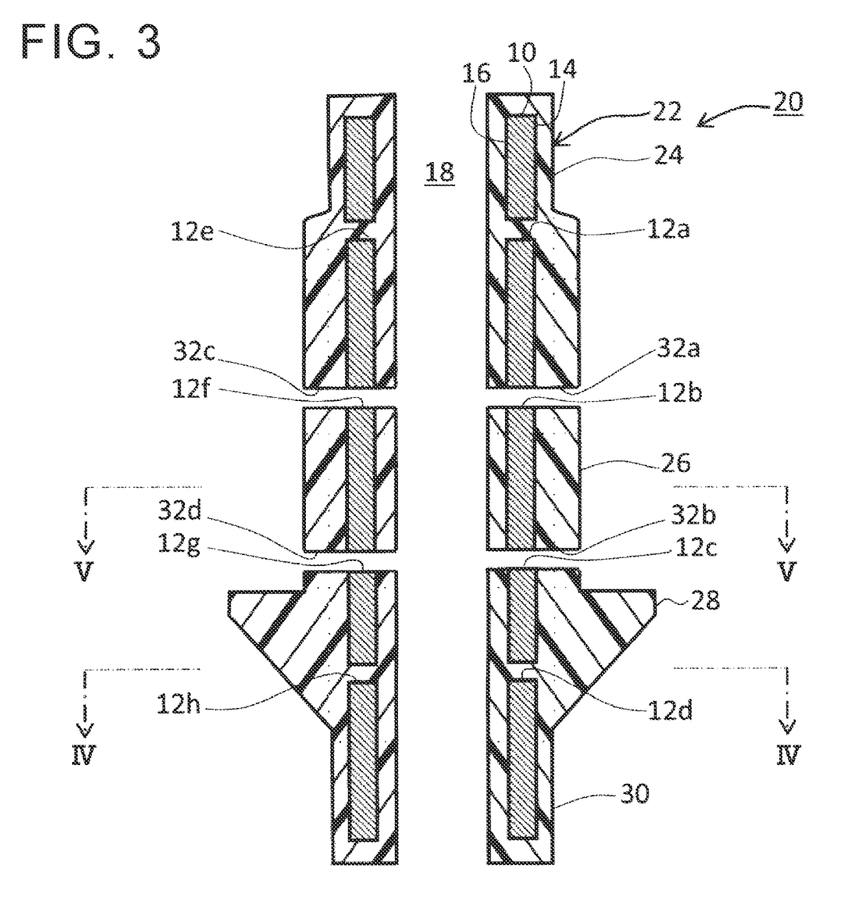
FIG. 3 is a view of an end surface including a central axis of the shaft.
Figure 4:
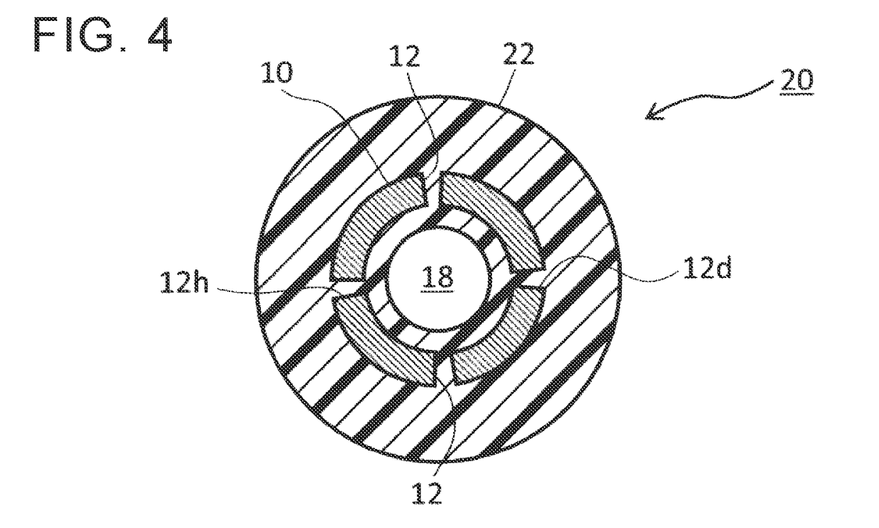
FIG. 4 is a view of an end surface of the shaft along a plane IV-IV of FIG. 3.
Figure 5:
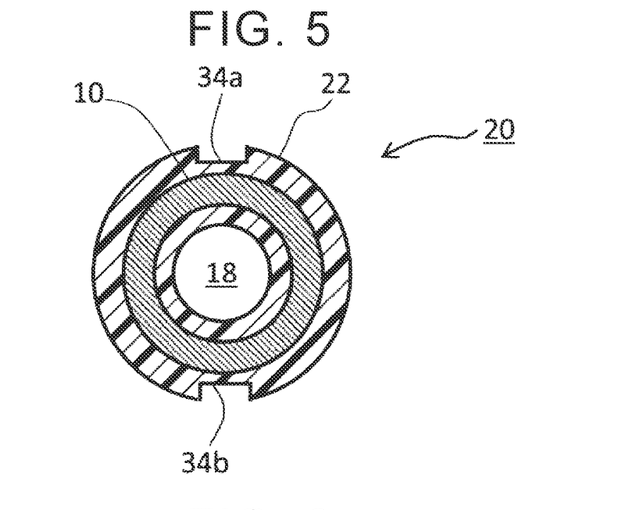
FIG. 5 is a view of an end surface of the shaft along a plane V-V of FIG. 3.

Next, the structure of the shaft 20 will be described in detail with reference to FIGS. 3 to 5. FIG. 3 is a view of an end surface of the shaft 20 shown in FIG. 2, along a plane stretching past an axial center of the cylinder. FIG. 4 is a view of an end surface of the shaft 20 along a plane IV-IV of FIG. 3, and FIG. 5 is a view of an end surface of the shaft 20 along a plane V-V of FIG. 3.

As shown in FIG. 3, the resin member 22 covers both the end sides of the core member 10 in the axial direction and the inner peripheral surface 16 of the core member 10, as well as the outer peripheral surface 14 of the core member 10. Among the plurality of the first hole portions 12 of the core member 10, eight representative ones (which are denoted by reference symbols 12a to 12h respectively) are depicted in FIG. 3. Among these hole portions, the interiors of the first hole portions 12a, 12e located close to the bearing sliding portion 24 and the first hole portions 12d, 12h located at the fastening portion 28 are filled with resin. Furthermore, the outer peripheral surface 14 side of the core member 10 and the inner peripheral surface 16 side thereof are contiguous to each other (see also FIG. 4). Thus, the resin member 22 is adhesively fixed to the core member 10 at the first hole portions 12, and the degree of adhesion between the resin member 22 and the core member 10 is enhanced in the parts other than the first hole portions 12 as well. It should be noted herein that adhesive fixation means that at least a part of the resin member 22 is formed in a shape corresponding to the uneven portion of the core member 10 and made to adhere thereto in a close contact state. Adhesion may be realized through any one of the following coupling methods, namely, mechanical coupling (coupling based on an anchoring effect), coupling based on a physical interaction (coupling based on a van der Waals force), coupling based on a chemical interaction (chemical coupling), and the like. In addition, the resin that has entered the first hole portions 12a, 12e, 12d, 12h physically keeps the resin member 22 and the core member 10 from moving in the circumferential direction, so a large torque can be transmitted between the resin member 22 and the core member 10.

On the other hand, the first hole portions 12b, 12c, 12f, 12g are not filled with resin at the rotor core fitting portion 26, and second hole portions 32a, 32b, 32c, 32d (which may be comprehensively referred to as second hole portions 32) that communicate with these first hole portions 12b, 12c, 12f, 12g respectively are provided through the resin member 22 inside and outside the rotor core fitting portion 26. That is, in the shaft 20, through-holes that penetrate from the inner hollow portion 18 to an outer peripheral side of the resin member 22 are formed by these second hole portions 32a, 32b, 32c, 32d. These through-holes can be used as flow passages for cooling oil as will be described later.

Incidentally, in the example shown in FIG. 3, all the four first hole portions 12b, 12c, 12f, 12g that are provided in the vicinity of the rotor core fitting portion 26 are formed as through-holes, but one or some of these four hole portions may be filled with resin as is the case with the first hole portions 12a, 12d, 12e, 12h. Thus, the degree of adhesion between the resin member 22 and the core member 10 in the vicinity of the rotor core fitting portion 26 can be enhanced. In particular, the vicinity of the rotor core fitting portion 26 is a part that receives a large torque from the rotor core, and is required to exhibit an adhesion strength that is high enough to resist the torque. It may be determined how many of the plurality of the first hole portions 12 should be filled with resin, in consideration of the necessity for flow passages for cooling oil and the degree of adhesion between the resin member 22 and the core member 10.

In the view of the end surface in FIG. 5, key grooves 34a, 34b are formed in an outer peripheral surface of the resin member 22. Although not shown in FIG. 2, these key grooves 34a, 34b extend in the axial direction in the vicinity of the rotor core fitting portion 26. The key grooves 34a, 34b are fitted to corresponding projecting parts of the rotor core that is fixed to the outer periphery of the shaft 20, and hence keep movements in the circumferential direction from being made. Thus, a large torque can be transmitted between the rotor core and the resin member 22. Incidentally, in the example of FIG. 5, the shaft 20 and the resin member 22 are kept from moving in the circumferential direction by the key grooves 34a, 34b. Instead of this, however, other structures can also be adopted. For instance, it is possible to mention an aspect in which movements in the circumferential direction are physically kept from being made by forming the cross-section of the outer peripheral surface of the resin member 22 in the shape of a polygon such as a hexagon, an octagon, or the like and forming the cross-section of the inner peripheral surface of the rotor core in a shape fitting this polygon.

Figure 6:
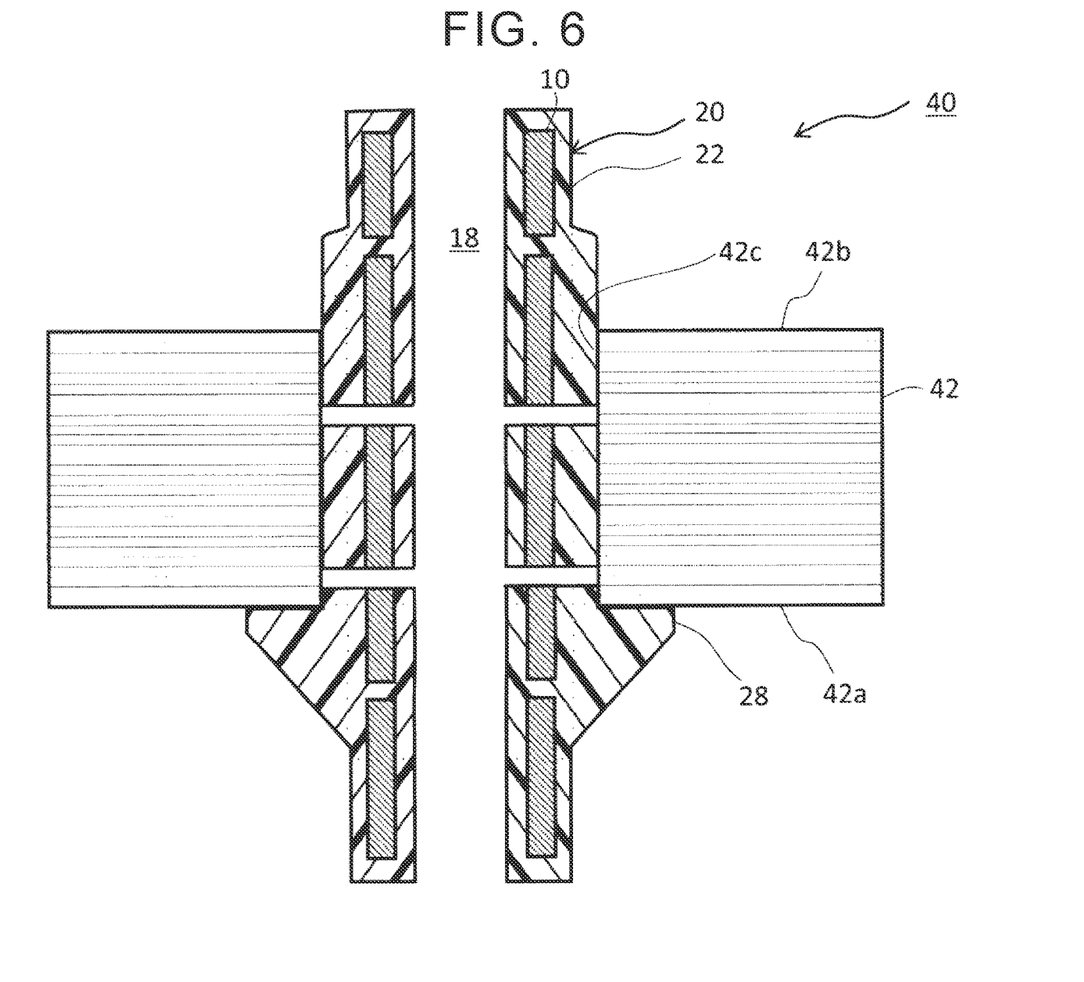
FIG. 6 is a view of an end surface including a central axis of the rotor with the shaft and a rotor core belonging to the rotor coupled to each other.

FIG. 6 shows a rotor 40 with a rotor core 42 fitted to the shaft 20. The rotor core 42 is a member in the shape of a circular cylinder formed by stacking a multitude of annularly punched electromagnetic steel sheets. The rotor core 42 is fitted to the shaft 20, and a lower surface 42a of the rotor core 42 is held in adhesive contact with an upper surface of the fastening portion 28.

The rotor core 42 is fitted to the shaft 20, for example, with a shaft hole enlarged through heating, that is, through "shrink fitting" or "warm fitting". Heating is carried out within an endurance temperature range of the resin member 22. In this case, after the temperature of the rotor core 42 becomes low, the shaft 20 and the rotor core 42 are securely fixed to each other. Besides, the rotor 40 may be formed by press-fitting the shaft 20 into the rotor core 42. Press-fitting is carried out with a force that does not damage the resin member 22 of the shaft 20. For example, in the case where the resin member 22 is formed of thermosetting resin, it is also conceivable to adopt an aspect in which the resin member 22 is allowed to deform to a certain extent instead of being completely cured before the end of press-fitting, and is completely cured through heating after the completion of press-fitting. Besides, a narrow gap may be provided between the shaft 20 and the rotor core 42 to facilitate the fitting therebetween. In this case, it is conceivable to adopt, for example, an aspect in which the shaft 20 and the rotor core 42 are fixed to each other by strongly compressing the rotor core 42 from above, an aspect in which the shaft 20 and the rotor core 42 are fixed to each other by injecting an adhesive into the gap therebetween, and the like.

After the shaft 20 is inserted into the rotor core 42, the rotor core 42 is fixed on an upper surface 42b thereof as necessary. This fixation is carried out by, for example, attaching a metal or resin fixation member to the resin member 22 on the upper surface 42b of the rotor core 42, and holding down the upper surface 42b through the use of this fixation member. In order to carry out this fixation, the resin member 22 can be formed in such a shape that the fixation member is attached thereto. For example, in the case where an end plate is used as the fixation member, it is possible to mention an aspect in which a groove for fitting the end plate into the resin member 22 is formed in the resin member 22. Besides, it is also conceivable to adopt an aspect in which a structure for attaching a bolt used to fix the fixation member is formed in the resin member 22. In the case where a large force is needed to fix the fixation member, the fixation member may be fastened to the core member 10.

After that, a magnet is inserted into the rotor core 42. Then, the rotor 40 is installed inside a stator, and a motor is thus formed.

The operation of the rotor 40 in the motor will now be described briefly. A magnetic pole of the rotor core 42 and a magnetic pole of the stator apply a magnetic force to each other, and the rotor 40 thereby rotates in the circumferential direction with a central axis of the shaft 20 serving as an axis of rotation. At this time, a torque is transmitted from the rotor core 42 to the resin member 22 of the shaft 20. The rotor core 42 is fitted to the key grooves 34a, 34b of the resin member 22, and hence enables torque transmission. Besides, a torque is transmitted from the resin member 22 to the core member 10. The first hole portions 12 of the core member 10 are filled with the resin constituting the resin member 22, and the torque can thereby be transmitted from the resin member 22 to the core member 10. Incidentally, the transmission path of the torque in a regeneration process and the transmission path of the torque in a power running process are reverse to each other, and there is a difference in that the rotational direction in the regeneration process and the rotational direction in the power running process are opposite each other. However, the rotor 40 basically operates in the same manner.

The transmitted torque is taken out from a tip side of the shaft 20 to the outside through a gear or the like. The gear designed for this purpose may be attached to the resin member 22, or may be attached to the core member 10. In the case where the gear is attached to the core member 10, the core member 10 as the strength member takes charge of much of torque transmission in the axial direction, so a large torque can be transmitted.

In the process of rotation, an eddy current flows through the rotor core 42, so the rotor core 42 generates heat, and the temperature thereof rises. Cooling oil is utilized to cool this rotor core 42. The cooling oil is caused to flow from the inner hollow portion 18 of the shaft 20, and reaches the outer peripheral surface of the shaft 20 through through-holes in the wall surface. These through-holes are holes formed through communication between the first hole portions 12 of the core member 10 and the second hole portions 32 of the resin member 22. Cooling passages for introducing this cooling oil into the rotor core 42 and discharging the cooling oil from the outer peripheral side thereof are formed through the rotor core 42. The cooling oil cools the rotor 40 while flowing through these cooling passages, due to a centrifugal force applied to the rotor 40.

In this rotor 40, the shaft 20 is formed through the use of the resin member 22. Therefore, the rotor 40 is lighter than in the case where the shaft 20 is formed only of a strength member such as metal or the like. As a result, the rotor 40 is advantageous in that the rolling resistance thereof decreases, and that the rotation efficiency thereof is enhanced. The degree of reduction in the weight of the shaft 20 can be variously set, but the weight of the shaft 20 can be reduced to, for example, about 30%, 40% or 50% thereof. In general, the resin member 22 exhibits lower strength than metal or the like. However, the core member 10 reinforces the strength of the resin member 22, so the shaft 20 can transmit a large torque as a whole. Therefore, the rotor 40 can also be utilized in, for example, a motor for driving an electrically operated vehicle, or the like.

Besides, in the shaft 20, surfaces of the bearing sliding portions 24, 30 are formed of resin as shown in FIG. 2. Therefore, smooth rotation with respect to bearings can be expected, and a loss in torque can be prevented. Besides, if the self-lubricity of resin at the bearing sliding portions 24, 30 is utilized, the shaft 20 can also be supported without using the bearings. In this case, an attempt to enhance smoothness and suppress heating can be made, through the appropriate use of lubricating oil. In addition, in the case where the shaft needs to be hard enough to be rotated at high speed, the core member 10 as the strength member may be exposed at the bearing sliding portions 24, 30.

In the rotor 40, the insulation properties in the rotor core 42 can also be ensured easily through the use of the resin member 22. The rotor core 42 is formed by punching the electromagnetic steel sheets as described above, so burrs may be formed at end portions of the rotor core 42. However, as shown in FIG. 6, an inner peripheral surface 42c of the rotor core 42 is in contact with the thick resin member 22, and does not come into contact with the core member 10 even in the case where the surface of the resin member 22 is damaged by the burrs. Accordingly, short-circuiting does not occur among layers of the electromagnetic steel sheets of the rotor core 42, and the electromagnetic properties of the rotor core 42 can be kept from deteriorating due to the influence of iron loss or the like.

In the foregoing description, the core member 10 is formed in the shape of a circular cylinder. However, the core member 10 can also assume the shape of a cylinder other than a circular cylinder. For example, it is possible to mention a cylinder whose cross-sectional shape is defined by a curve of a non-precise circle such as an ellipse or the like, a polygonal cylinder whose cross-sectional shape is a polygon, and the like. Besides, the first hole portions 12 are presented as an example of the uneven portion provided on the outer peripheral surface 14 of the core member 10. These first hole portions 12 constitute the uneven portion whose outer peripheral surface assumes an uneven shape that locally deviates from a circle. As such an uneven portion, it is possible to mention an aspect in which a projection is provided, and an aspect in which a recess is provided as will be described in the second embodiment, in addition to the first hole portions 12. However, the uneven portion is not limited to such a local shape. At least a part of the cross-section of the outer peripheral surface may assume a shape that deviates from a smooth circle. For example, an elliptical cylinder or a polygonal cylinder has an uneven outer peripheral surface that deviates from a circle over a wide range, and forms the uneven portion.

Besides, in the foregoing description, in the shaft 20, the inner peripheral surface 16 of the core member 10 is also covered with the resin member 22 as shown in FIGS. 3 to 5. In general, however, resin exhibits lower thermal conductivity than metal or the like, so the cooling efficiency of the core member 10 covered with the resin member 22 falls. Thus, it is also conceivable to adopt an aspect in which a part or the entirety of the inner peripheral surface 16 of the core member 10 is not covered with the resin member 22. In this case, the adhesion strength between the core member 10 and the resin member 22 falls, so the area covered with the resin member 22 may be reduced within such a range that a required torque can be transmitted. By the same token, it is also conceivable to adopt an aspect in which a part or the entirety of each of both the ends of the core member 10 in the axial direction is not covered with the resin member 22.

Figure 7:
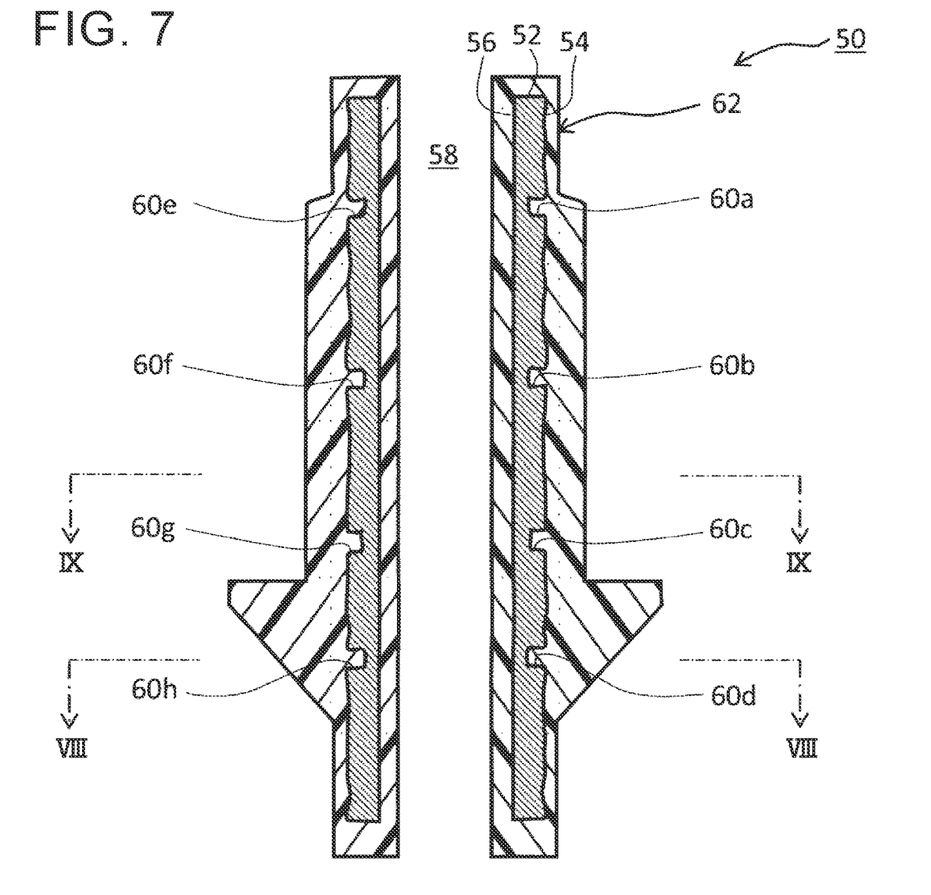
FIG. 7 is a view of an end surface including a central axis of a shaft belonging to a rotor according to the second embodiment of the disclosure.
Figure 8:
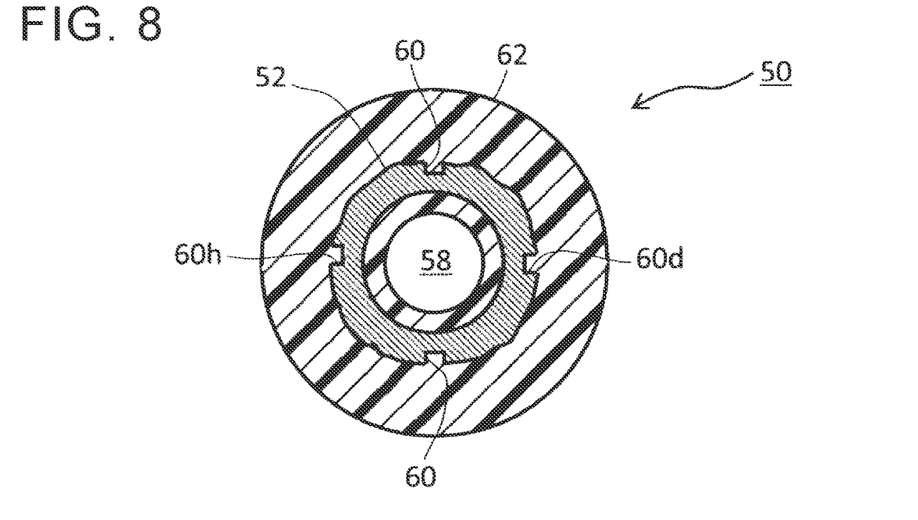
FIG. 8 is a view of the end surface of the shaft along a plane VIII-VIII of FIG. 7.
Figure 9:
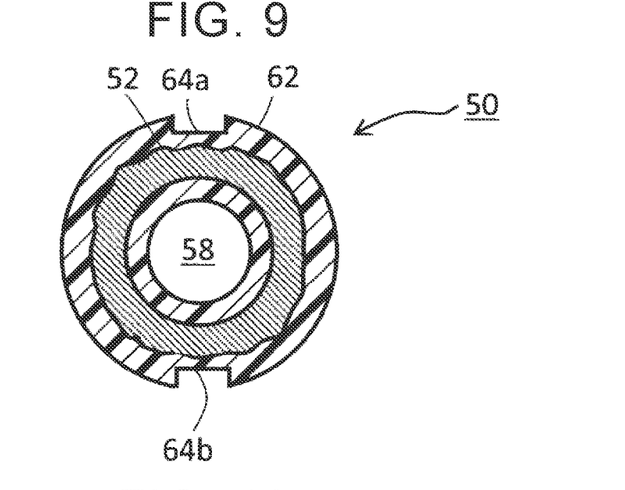
FIG. 9 is a view of an end surface of the shaft along a plane IX-IX of FIG. 7.

Next, the rotor according to the second embodiment will be described with reference to FIGS. 7 to 9. FIG. 7 is a view of an end surface corresponding to FIG. 3. Besides, FIG. 8 is a view of an end surface along a plane VIII-VIII of FIG. 7, and FIG. 9 is a view of an end surface along a plane IX-IX of FIG. 7. FIGS. 8 and 9 correspond to FIGS. 4 and 5 respectively. The following description will center on the difference from the first embodiment.

A shaft 50 according to the second embodiment shown in FIGS. 7 to 9 is formed of a core member 52 and a resin member 62. The core member 52 is a member in the shape of a circular cylinder, and a plurality of recessed portions 60a to 60h (which may be comprehensively referred to as recessed portions 60) that form an uneven portion are formed in an outer peripheral surface 54 of the core member 52. The recessed portions 60 do not penetrate to an inner peripheral surface 56, and an inner hollow portion 58 of the core member 52 is in a state where only both ends thereof in the axial direction are open.

The outer peripheral surface 54 of the core member 52 is subjected to blast processing based on shot blasting. That is, the fatigue strength of the outer peripheral surface 54 is enhanced by applying a compressive stress to the outer peripheral surface 54 through collision of a group of small metal particles therewith at high speed, lessening the tensile stress of the outer peripheral surface 54, and reducing the residual stress thereof. Thus, as shown in FIG. 7 schematically, a multitude of tiny unevenness are formed on the outer peripheral surface 54, and the outer peripheral surface 54 has a coarse surface. This coarseness is an aspect of the uneven portion plastically formed through blast processing.

The resin member 62 is integrally molded around the core member 52. The resin member 62 covers both the ends of the core member 52 and the inner peripheral surface 56 thereof as well as the outer peripheral surface 54 thereof. The resin member 62 is formed in a projecting shape at the recessed portions 60, so as to enter the recessed portions 60. Besides, the resin member 62 is also formed in a shape matching the unevenness formed on the outer peripheral surface 54 through blast processing, and the outer peripheral surface 54 is in adhesive contact with the resin member 62. The shape of an outer periphery of the resin member 62 is the same as in the first embodiment. As shown in FIG. 9, key grooves 64a and 64b into which a rotor core is fitted are formed in an outer peripheral surface of the resin member 62.

In the second embodiment, unlike the first embodiment, no hole portions are formed through the core member 52, and the recessed portions 60 are formed in the outer peripheral surface 54. Therefore, the resin member 62 is simply linked with the inner peripheral surface 56 side of the core member 52 only through end portions of the resin member 62 in the axial direction. In this respect, the degree of adhesion to the core member 52 is relatively low. However, the resin that has entered the recessed portions 60 physically keeps the core member 52 and the resin member 62 from moving in the circumferential direction, so a large torque can be transmitted.

Besides, the resin member 62 is in adhesive contact with the unevenness formed on the outer peripheral surface 54 of the core member 52 through blast processing. This uneven shape has a larger contact area than a flat shape, so the degree of adhesion between the resin member 62 and the core member 52 is significantly enhanced. Besides, the unevenness resulting from this blast processing also keep the core member 52 and the resin member 62 from moving in the circumferential direction. Accordingly, in the second embodiment as well as the first embodiment, a large rotational torque can be transmitted.

Incidentally, in the case where the required adhesion strength can be ensured only by the recessed portions 60, there is no need to form the unevenness through blast processing. On the other hand, in the case where the required adhesion strength can be ensured only by the unevenness resulting from blast processing, there is no need to form the recessed portions 60. The formation of the unevenness through blast processing is also applicable to the first embodiment. Besides, the first embodiment and the second embodiment may be combined with each other to provide both the first hole portions 12 and the recessed portions 60.

In the foregoing description, shot blasting has been mentioned as an example of blast processing. Blast processing serves to modify a surface through collision of a projection material with a processed surface at high speed. A solid metal, a polishing material, or the like is usually used as the projection material. Sand blasting that is carried out in a work box called a sand blaster, and wet blasting that is carried out with a polishing agent mixed with water are also known. Besides, the surface may be modified according to a method of cavitation peening in which bubbles in the water flowing at high speed are utilized as the projection material. The enhancement of the fatigue strength of the outer peripheral surface, the formation of unevenness by making the surface coarse, and an increase in surface area are achieved by carrying out blast processing.

The rotor according to the third embodiment will be described with reference to FIGS. 10 and 11. The third embodiment is a specific form that can be additionally introduced into the resin member 22 of the first embodiment and the resin member 62 of the second embodiment.

Figure 10:
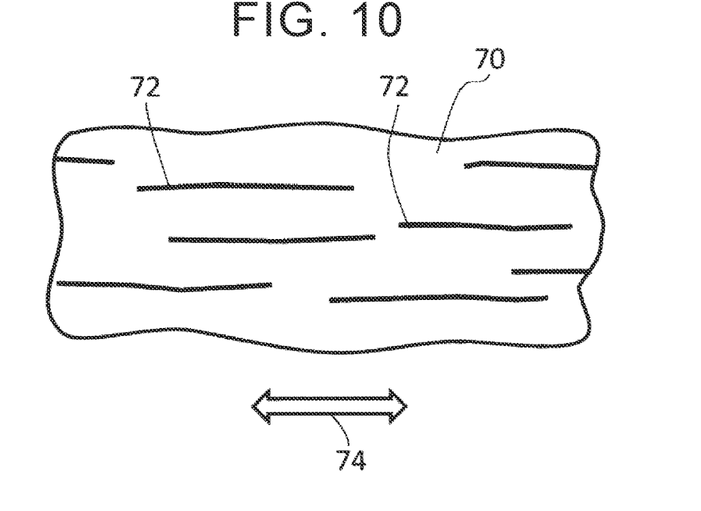
FIG. 10 is a schematic view of a glass fiber-containing resin member included in a rotor according to the third embodiment of the disclosure.

FIG. 10 is a view schematically showing a part of a resin member 70. A plurality of glass fibers 72 are added into the resin member 70 as fillers. In general, the glass fibers exhibit higher strength than resin, and exhibit high tensile strength especially in a fiber direction. Therefore, in the case where a load is applied in a direction indicated by an arrow 74 in the drawing, the resin member 70 can be restrained from being deformed and destroyed. Thus, a larger torque can be transmitted than in the case where the glass fibers 72 are not added.

In general, the glass fibers 72 tend to be aligned along the flow direction of resin. Accordingly, in forming the resin member 70, molten resin may be injected along a direction in which the resin member 70 is desired to be reinforced, for example, in the circumferential direction or the axial direction. Besides, in the case where the resin member 70 is desired to be reinforced in a plurality of directions, molten resin may be stirred and then injected such that the glass fibers 72 are randomly oriented. The glass fibers 72 are exemplary reinforcement fibers. Other reinforcement fibers such as carbon fibers or the like may be added, as fillers, instead of or in combination with the glass fibers 72. The content of the fibers may be determined in accordance with the required strength.

Figure 11:
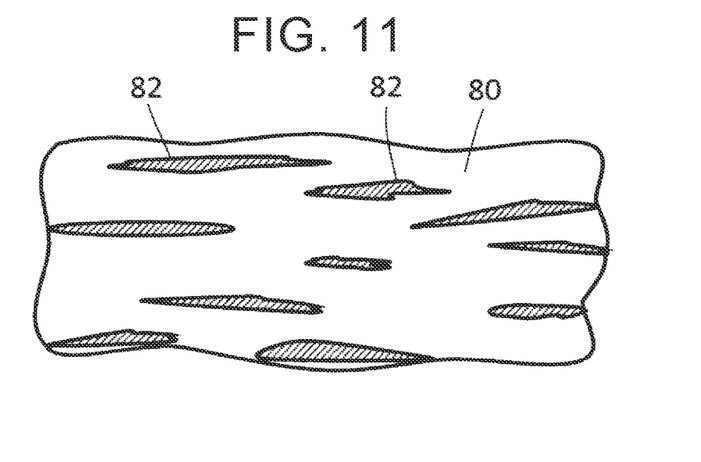
FIG. 11 is a schematic view of a metal filler-containing resin member included in the rotor.

FIG. 11 is a view schematically showing a part of a resin member 80. Long-formed metals 82 are added, as high heat radiation fillers, into the resin member 80. The metals exhibit high thermal conductivity, so the resin member 80 exhibits higher thermal conductivity than in the case where only resin is used. In particular, since the metals 82 are formed long, the surface area is larger and the thermal conductivity is higher than in the case where a metal block of the same volume or the same weight is added. Besides, the thermal conductivity in a longitudinal direction is enhanced in particular. Thus, the temperature of the rotor (the magnet) can be restrained from becoming high, and the performance of the rotor can be prevented from deteriorating.

In the same manner as in the aspect described with reference to FIG. 10, the long-formed metals 82 tend to ensure alignment in the flow direction of molten resin, and it is advisable to cause the resin to flow in a direction in which thermal conductivity is desired to be enhanced, for example, in a direction perpendicular to the outer peripheral surface. It should be noted, however, that the orientation in random directions is also acceptable in the case where the control of the flow of the resin is difficult to perform. Besides, isotropy may be ensured by using minute metal blocks as fillers instead of the long-formed metals 82.

Incidentally, the fillers generally do not emerge on the surface of the mixed resin, but tend to accumulate inside the resin. Accordingly, little influence is considered to be exerted on the friction in the bearing regions, in both the resin member 70 shown in FIG. 10 and the resin member 80 shown in FIG. 11. Besides, the resin member 80 shown in FIG. 11 is considered to be unlikely to cause short-circuiting among the electromagnetic steel sheets of the rotor core.

What is claimed is:

1. A rotor comprising:
   a shaft including a core member and a resin member, the core member being a high-strength member that is formed cylindrically, an outer peripheral surface of the core member being provided with an uneven portion, and the resin member covering the outer peripheral surface while being adhesively fixed to the uneven portion; and
   a rotor core that is attached to a periphery of the resin member,
   wherein the uneven portion is provided by a first hole portion that penetrate from the outer peripheral surface to an inner hollow portion.

2. The rotor according to claim 1, wherein the uneven portion is provided through plastic forming or chemical processing.

3. The rotor according to claim 2, wherein the plastic forming is carried out as one of following processing methods (i) blast processing, (ii) half blanking, and (iii) coining.

4. The rotor according to claim 2, wherein the chemical processing is etching processing.

5. The rotor according to claim 1, wherein:
   the resin member is provided with a second hole portion that communicates with the first hole portion of the core member; and
   a flow passage for cooling oil that extends from the inner hollow portion of the core member to the outer peripheral surface of the resin member is provided by the first hole portion and the second hole portion.

6. The rotor according to claim 1, wherein:
   the outer peripheral surface is provided with the uneven portion; and
   the uneven portion is provided by a recessed portion that does not penetrate to an inner hollow portion.

7. The rotor according to claim 1, wherein a plurality of glass fibers are added into the resin member.

8. The rotor according to claim 1, wherein a plurality of metals are added into the resin member.

* * * * *